US 9,828,164 B2

(12) United States Patent
Denson

(10) Patent No.: US 9,828,164 B2
(45) Date of Patent: Nov. 28, 2017

(54) INTERMODAL CONTAINER AND METHOD OF CONSTRUCTING SAME

(71) Applicant: Fontaine Engineered Products, Inc., Jasper, AL (US)

(72) Inventor: John Clifford Denson, Birmingham, AL (US)

(73) Assignee: Fontaine Engineered Products, Inc., Jasper, AL (US)

( * ) Notice: Subject to any disclaimer, the term of this patent is extended or adjusted under 35 U.S.C. 154(b) by 160 days.

(21) Appl. No.: 14/706,188

(22) Filed: May 7, 2015

(65) Prior Publication Data
US 2015/0336732 A1 Nov. 26, 2015

Related U.S. Application Data

(60) Provisional application No. 62/001,756, filed on May 22, 2014.

(51) Int. Cl.
B65D 90/20 (2006.01)
B65D 81/38 (2006.01)
(Continued)

(52) U.S. Cl.
CPC .......... B65D 81/3816 (2013.01); B29C 70/86 (2013.01); B65D 88/02 (2013.01);
(Continued)

(58) Field of Classification Search
CPC ...... B65D 90/20; B65D 88/129; B65D 88/10; B65D 88/121
(Continued)

(56) References Cited

U.S. PATENT DOCUMENTS 2,791,463 A 5/1957 Levitt
2,962,323 A 11/1960 McBride
(Continued)

FOREIGN PATENT DOCUMENTS

DE 2444523 A1 4/1976
EP 1162058 A1 12/2001
(Continued)

OTHER PUBLICATIONS

Great Dane Trailers, Evolving Trailer Technology, vol. 10, issue 4, 1996.
(Continued)

Primary Examiner — Stephen Castellano
(74) Attorney, Agent, or Firm — Andrus Intellectual Property Law, LLP

(57) ABSTRACT

An intermodal container includes a supporting frame having a rectangular base; a first pair of upright posts extending upwardly from the rectangular base; and a first cross-beam coupling the first pair of upright posts. A second pair of upright posts extends upwardly from the rectangular base proximate an opposite end thereof, and a second cross-beam couples the second pair of upright posts. A longitudinally extending connector beam has a first end coupled to the first cross-beam, and a second end coupled to the second cross-beam. The intermodal container further includes a plurality of panels, and each panel is made of fiber reinforced plastic and insulation foam that have been integrally molded together. The panels are coupled to the supporting frame and serve as side walls, end wall, roof, and floor of the container. A method for constructing an intermodal container is also disclosed.

15 Claims, 13 Drawing Sheets

(51) Int. Cl.
*B65D 88/02* (2006.01)
*B65D 90/02* (2006.01)
*B29C 70/86* (2006.01)
*B65D 88/74* (2006.01)
B29C 70/48 (2006.01)
B29C 70/60 (2006.01)

(52) U.S. Cl.
CPC ......... *B65D 88/745* (2013.01); *B65D 90/022* (2013.01); *B65D 90/023* (2013.01); *B65D 90/20* (2013.01); *B29C 70/48* (2013.01); *B29C 70/603* (2013.01); *Y10T 29/49828* (2015.01)

(58) Field of Classification Search
USPC ........................................................ 220/1.5
See application file for complete search history.

(56) References Cited

U.S. PATENT DOCUMENTS

| | | | |
|---|---|---|---|
| 3,224,500 A | 12/1965 | Bennett | |
| 3,515,303 A * | 6/1970 | Hannah | B65D 90/06 220/1.5 |
| 4,091,743 A | 5/1978 | Lemon | |
| 4,309,013 A * | 1/1982 | Howe | B65D 19/12 108/53.1 |
| 5,111,950 A * | 5/1992 | Wylenzek | B65D 88/129 108/55.1 |
| 5,403,062 A | 4/1995 | Sjostedt et al. | |
| 5,403,063 A | 4/1995 | Sjostedt et al. | |
| 5,429,066 A | 7/1995 | Lewit et al. | |
| 5,449,081 A | 9/1995 | Sjostedt et al. | |
| 5,533,275 A | 7/1996 | Lawton | |
| 5,664,518 A | 9/1997 | Lewit et al. | |
| 5,741,042 A * | 4/1998 | Livingston | B62D 29/045 220/1.5 |
| 5,800,749 A | 9/1998 | Lewit et al. | |
| 5,816,423 A | 10/1998 | Fenton et al. | |
| 5,830,308 A | 11/1998 | Reichard | |
| 5,897,818 A | 4/1999 | Lewit et al. | |
| 5,908,591 A | 6/1999 | Lewit et al. | |
| 5,947,812 A | 9/1999 | Henning | |
| 5,979,684 A | 11/1999 | Ohnishi et al. | |
| 6,004,492 A | 12/1999 | Lewit et al. | |
| 6,013,213 A | 1/2000 | Lewit et al. | |
| 6,203,419 B1 | 3/2001 | Onken | |
| 6,206,669 B1 | 3/2001 | Lewit et al. | |
| 6,497,190 B1 | 12/2002 | Lewit | |
| 6,505,883 B1 | 1/2003 | Ehrlich | |
| 6,543,469 B2 | 4/2003 | Lewit et al. | |
| 6,723,273 B2 | 4/2004 | Johnson et al. | |
| 6,755,998 B1 | 6/2004 | Reichard et al. | |
| 6,758,057 B2 | 7/2004 | Vince, II et al. | |
| 6,869,561 B2 | 3/2005 | Johnson et al. | |
| 6,911,252 B2 | 6/2005 | Lewit et al. | |
| 7,025,408 B2 | 4/2006 | Jones et al. | |
| 7,743,715 B2 | 6/2010 | Becker et al. | |
| 7,748,172 B2 | 7/2010 | Zupancich et al. | |
| 7,762,617 B2 | 7/2010 | Booher | |
| 7,901,537 B2 | 3/2011 | Jones et al. | |
| 7,963,410 B2 | 6/2011 | Joergensen et al. | |
| 8,186,747 B2 | 5/2012 | Bloodworth et al. | |
| 8,377,247 B2 | 2/2013 | Guzman et al. | |
| 8,388,045 B2 | 3/2013 | Huang et al. | |
| 8,474,871 B1 | 7/2013 | Ludwick | |
| 2012/0074012 A1* | 3/2012 | Crane | B61D 47/00 206/386 |
| 2014/0199551 A1 | 7/2014 | Lewit | |
| 2014/0262011 A1 | 9/2014 | Lewit et al. | |

FOREIGN PATENT DOCUMENTS

| | | |
|---|---|---|
| EP | 2428463 A1 | 3/2012 |
| GB | 710898 | 6/1954 |
| WO | 9904964 A1 | 2/1999 |
| WO | 9936243 A1 | 7/1999 |
| WO | 2011070145 A1 | 6/2011 |
| WO | 2012171963 A1 | 12/2012 |

OTHER PUBLICATIONS

Crane Composites, Kemlite Reefer Roof, Technical Data Sheet, Jul. 2012.
Johnson Refrigerated Truck Bodies, The Majestic Series, online product literature, website visited on Mar. 7, 2014, http://www.johnsontruckbodies.com/products/majestic_home.asp.
International Search Report and Written Opinion in corresponding PCT Appln. No. PCT/US2015/030547, dated Sep. 29, 2015.
International Preliminary Report on Patentability in corresponding PCT Appln. No. PCT/US2015/030547, dated Dec. 1, 2016.

* cited by examiner

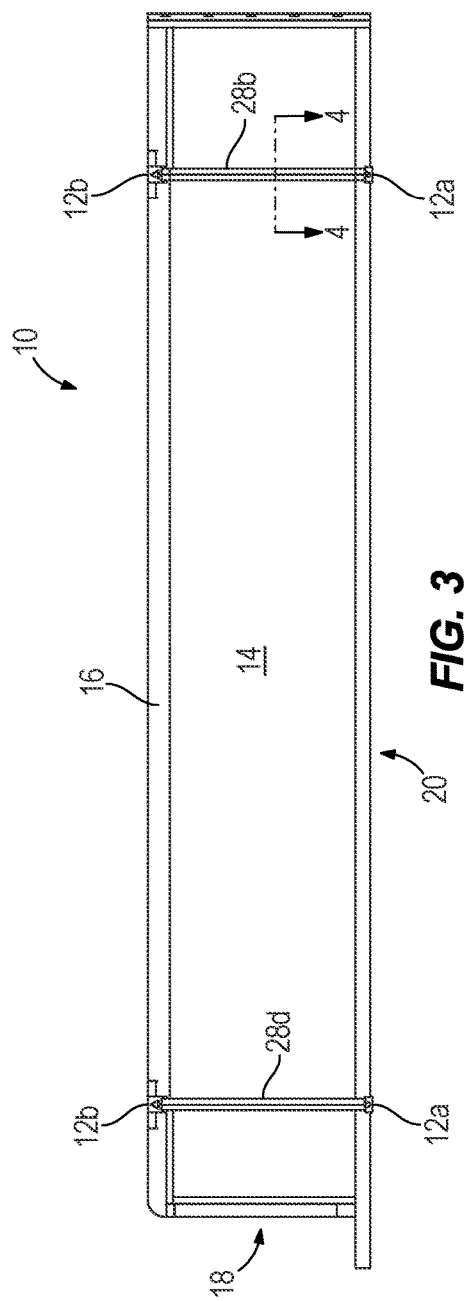
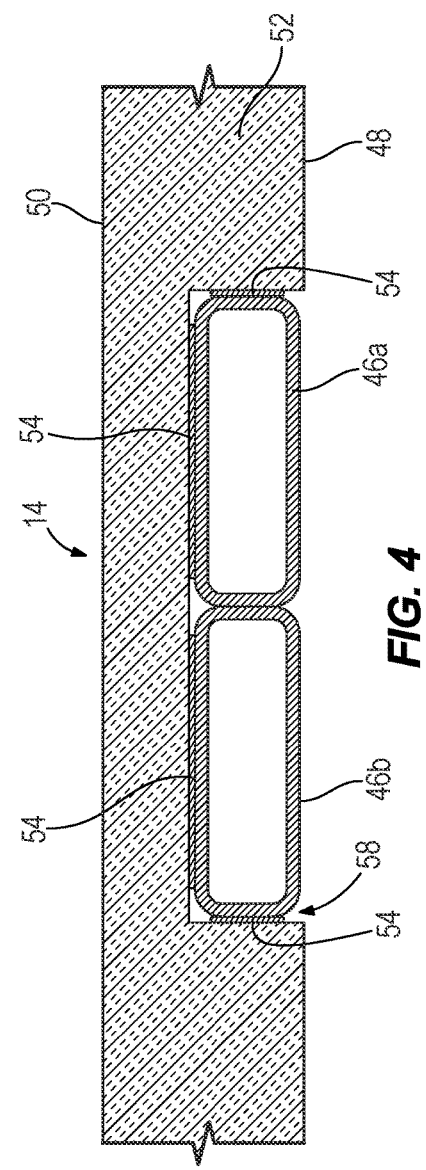
FIG. 3
FIG. 4

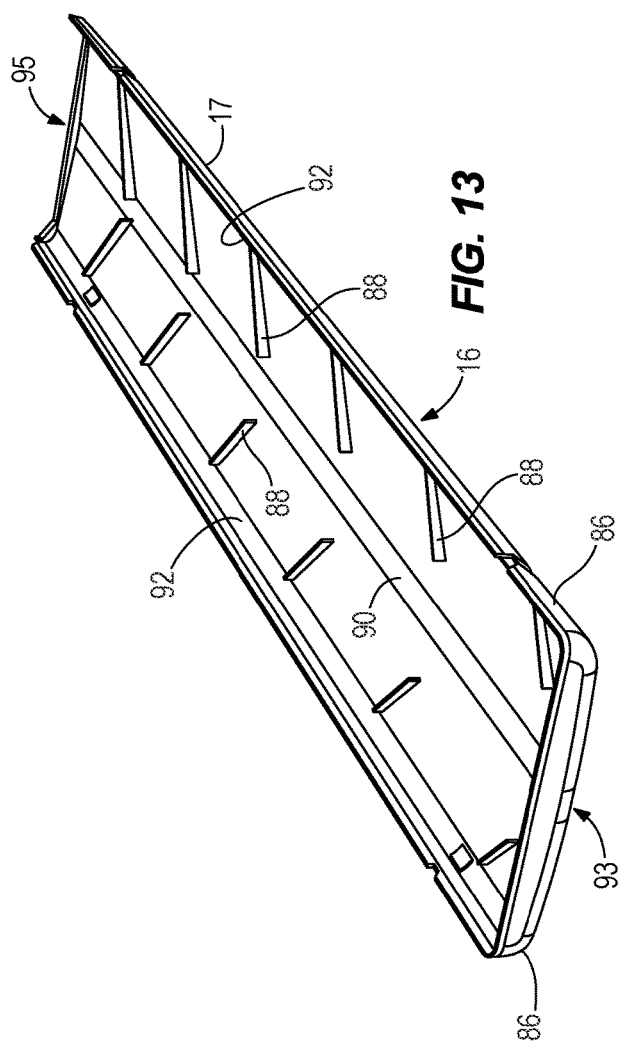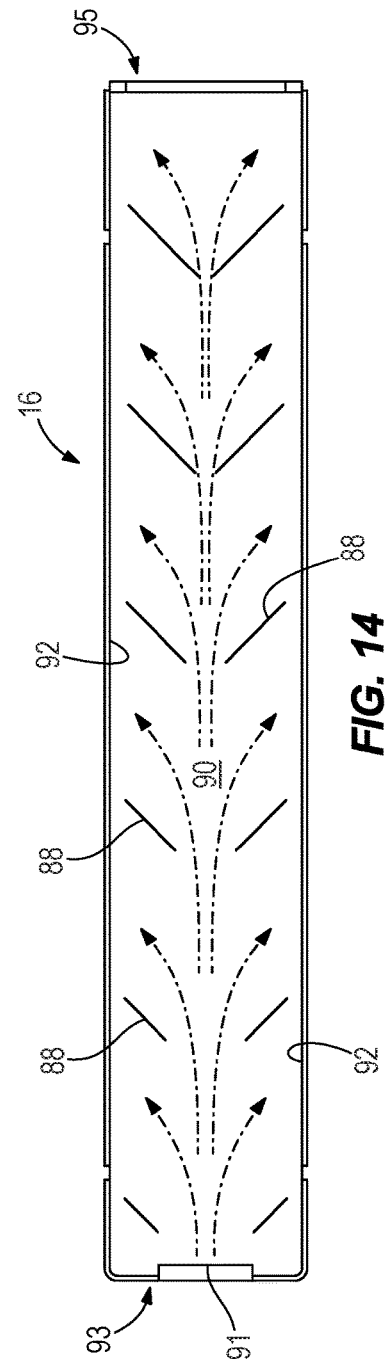

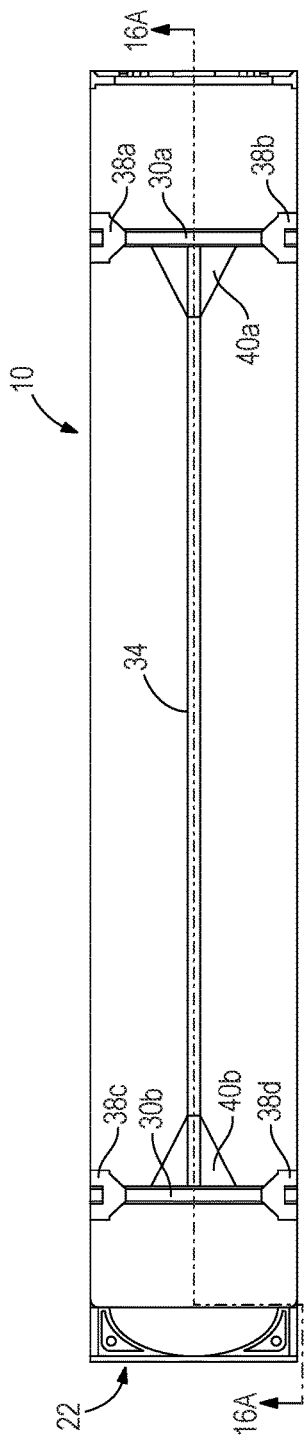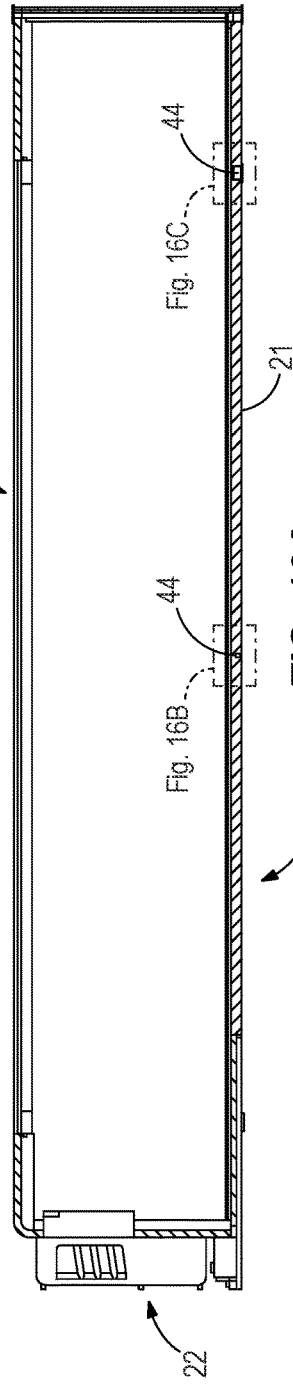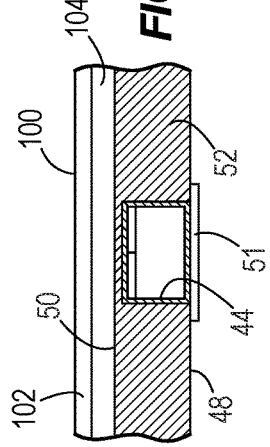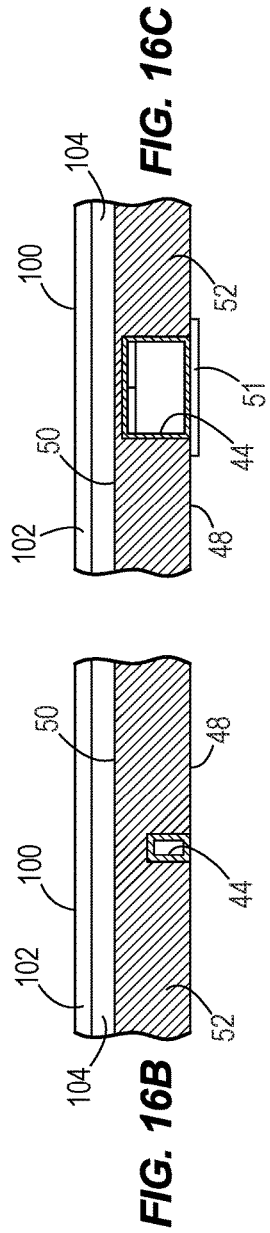

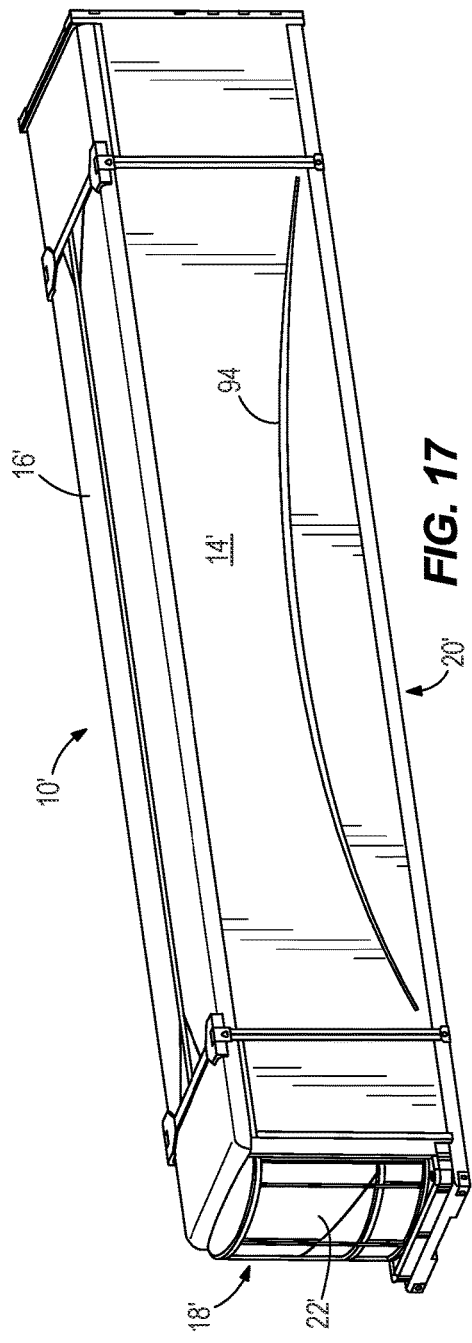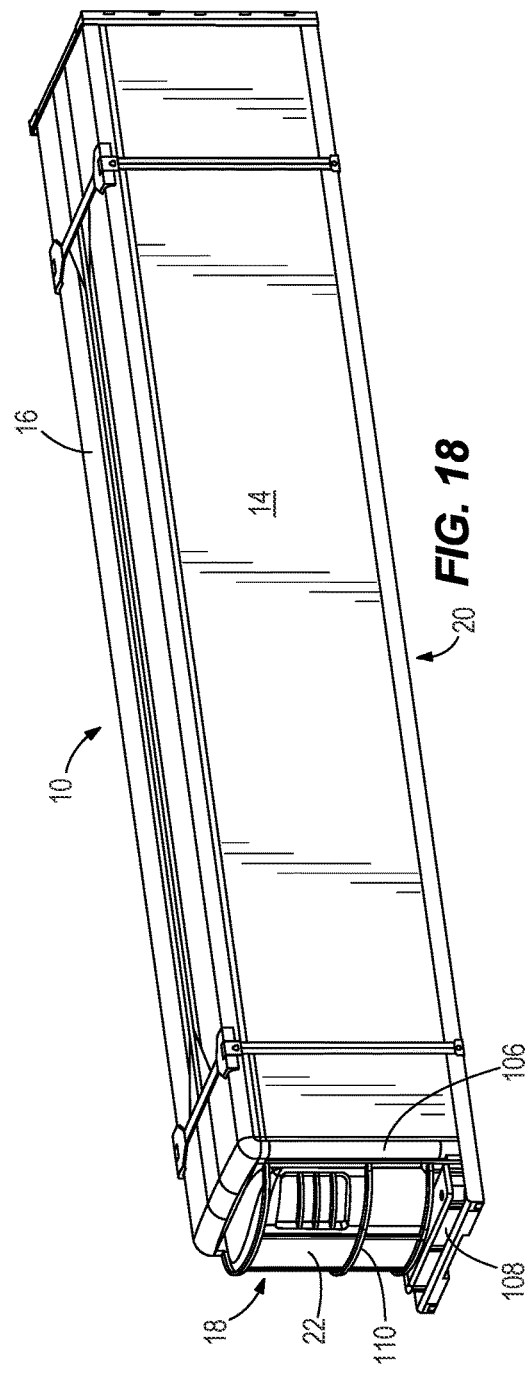

INTERMODAL CONTAINER AND METHOD OF CONSTRUCTING SAME

CROSS-REFERENCE TO RELATED APPLICATION

This application claims the benefit of U.S. Provisional Application Ser. No. 62/001,756, filed May 22, 2014, the entirety of which is hereby incorporated by reference herein.

FIELD

The present disclosure relates to intermodal containers. In one example, the present disclosure relates to temperature-controlled intermodal containers and materials and methods for constructing such containers.

BACKGROUND

Current temperature-controlled (e.g., refrigerated) containers for transporting goods utilize panels constructed of aluminum and/or fiber reinforced plastic (FRP) sheets coupled with insulation materials so as to maintain a desired temperature within the container. Current temperature-controlled containers are subject to heat loss due to panel design and material selection. In cases where insulation foam is between the wall's panels, the components de-bond over time and lose thermal efficiency due to exposure to moisture and loss of thermally efficient gasses within the insulation. Further, containers made of such panels are heavy and rely on large metallic beams and posts in order to support the system.

Bulk cargo may be transported using various modes, such as ship, truck, or railcar. Typically, the cargo is transported in rectangular, box-like containers that can be temporarily fixed to and transported on a railcar or intermodal chassis. Such containers, referred to as intermodal containers, allow for a single load to be transported by multiple modes, e.g., truck, rail, or ship, without moving the cargo from one container to another. Such intermodal containers are also able to be lifted by cranes and may be stacked on top of one another in order to transport multiple containers in one haul. Intermodal containers may be temperature-controlled if the goods they hold require this.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure is of an intermodal container comprising a supporting frame having a rectangular base; a first pair of upright posts extending upwardly from the rectangular base; and a first cross-beam coupling a top end of a first post in the first pair of upright posts to a top end of a second post in the first pair of upright posts. A second pair of upright posts extends upwardly from the rectangular base proximate an opposite end thereof, and a second cross-beam couples a top end of a third post in the second pair of upright posts to a top end of a fourth post in the second pair of upright posts. A longitudinally extending connector beam has a first end coupled to the first cross-beam, and a second end coupled to the second cross-beam. The intermodal container further comprises a plurality of large panels, each panel in the plurality of panels comprising fiber reinforced plastic and insulation foam that have been integrally molded to one another. The panels are coupled to the supporting frame so as to form at least one of a side wall, an end wall, a roof, and a floor of the container. The fiber reinforced plastic may serve as the outer surface of each panel, and fully encapsulates the insulation foam within each panel. The plurality of panels are adhered to one another and to the supporting frame with structural adhesives.

The present disclosure is also of a method for constructing an intermodal container. The method includes constructing a supporting frame having a rectangular base; a first pair of upright posts extending upwardly from the rectangular base; a first cross-beam coupling a top end of a first post in the first pair of upright posts to a top end of a second post in the first pair of upright posts; a second pair of upright posts extending upwardly from the rectangular base proximate an opposite end thereof, a second cross-beam coupling a top end of a third post in the second pair of upright posts to a top end of a fourth post in the second pair of upright posts; and a longitudinally extending connector beam having a first end coupled to the first cross-beam, and a second end coupled to the second cross-beam. The method further includes providing a fiber reinforced plastic panel formed of glass fiber textile and insulation foam, and coupling the fiber reinforced plastic panel to the supporting frame so as to form at least one of a side wall, an end wall, a roof, and a floor of the container.

BRIEF DESCRIPTION OF THE DRAWINGS

The present disclosure is described with reference to the following Figures. The same numbers are used throughout the Figures to reference like features and like components.

FIG. 3 is a side view of the intermodal container.

FIG. 4 is a cross sectional view through the line 4-4 in FIG. 3.

FIG. 13 is a perspective underside view of a roof panel according to the present disclosure.

FIG. 14 is a schematic view of the underside of the roof panel of FIG. 13.

FIG. 15 is a top view of the intermodal container of FIGS. 1 and 3.

FIG. 16A shows a cross sectional view through the line 16A-16A of FIG. 15.

FIGS. 16B and 16C show detailed views of portions of a floor panel of the intermodal container, as indicated in FIG. 16A.

FIGS. 17, 18, and 19 are included to illustrate the modularity of the intermodal container according to the present disclosure.

DETAILED DESCRIPTION

Figure 1:
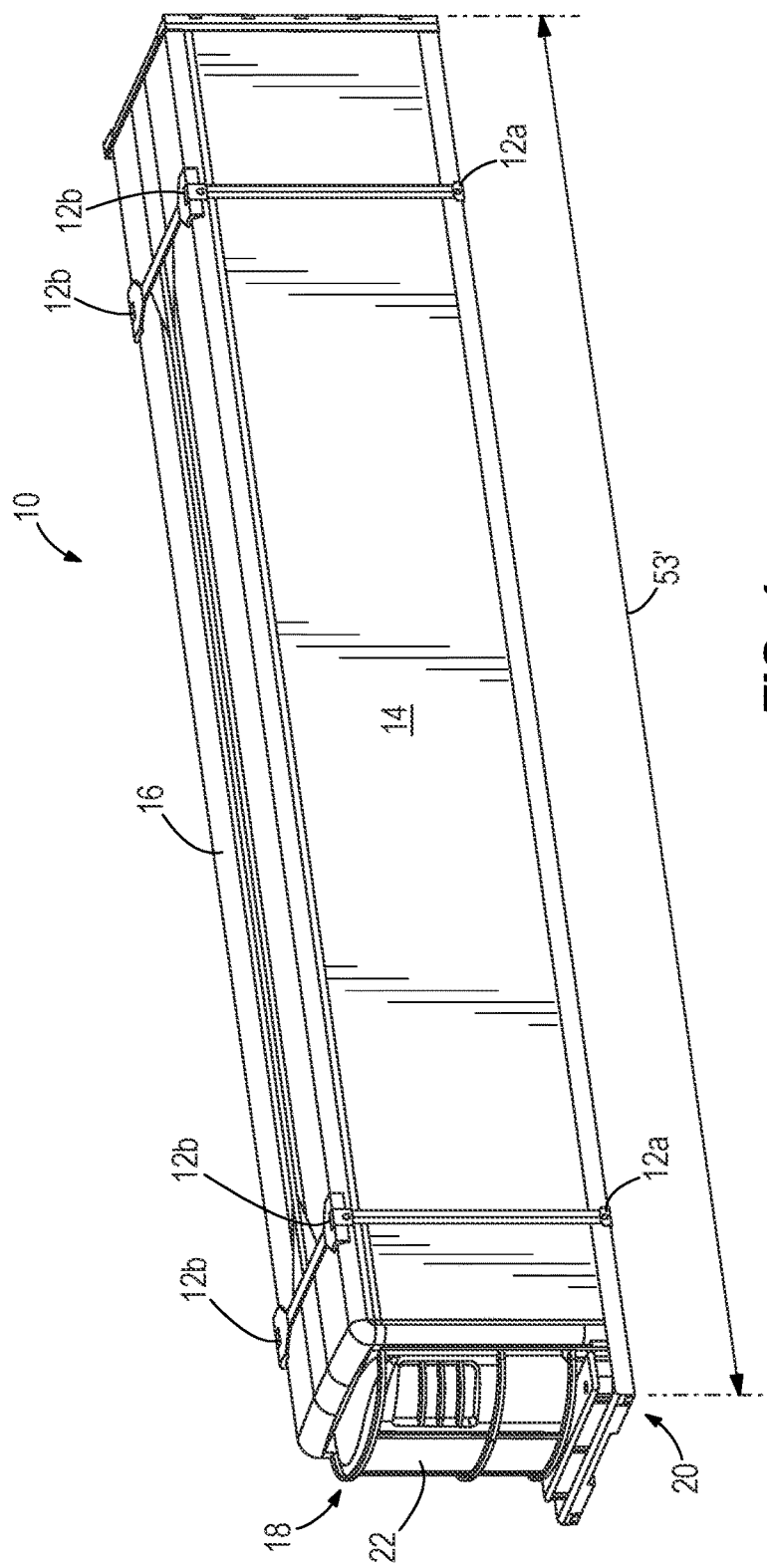
FIG. 1 is a perspective view of a temperature-controlled intermodal container according to the present disclosure.

FIG. 1 shows in intermodal container 10 that is temperature controlled, such as for example, a refrigerated container. That the container 10 is intermodal means that it is capable of being transported on more than one type of vehicle, such as for example, a railroad car, a chassis trailer and truck, and/or a ship. The container 10 can be temporarily fixed to and transported via one of these modes without moving its cargo from one container to another. A standard box-shaped intermodal container has a length of forty feet, a width of eight feet, and has structural lifting and stacking points at each of its eight corners. These points, referred to herein as 40-foot points, correspond to a standard position used by overhead cranes throughout the shipping industry to move cargo containers, as well as to locations where fitments can be provided to allow the container to be stacked atop and locked to a chassis trailer or a railcar bed. Though intermodal containers may be longer than forty feet, longer containers still provide structural fitments for lifting and stacking at the 40-foot points so that they are compatible with industry standard modes of transportation and lifting/hauling machines.

In the example shown, the container 10 is fifty-three feet in length and comprises standard ISO fittings 12a, 12b at each of its 40-foot points for stacking and lifting the container 10. The fittings 12a, for example, are for receiving male locking fitments provided on a chassis trailer or railroad car, while the fittings 12b are provided for insertion of a crane for lifting the container 10. The fittings 12b alternatively allow for insertion of a male fitting so as to allow another container to be stacked on top of and locked to the container 10 that is shown. It should be understood that although only two lower fittings 12a are shown on the near side of the container, two additional fittings 12a are provided at similar locations on the far side of the container as well. It should further be understood that the container 10 could have other lengths and still fall within the scope of the present disclosure.

The container 10 comprises a side wall 14 (an opposite side wall is provided on the far side of the container 10, but not shown), a roof 16, an end wall 18, and a floor 20, each of which will be described further herein below. In this example, a refrigeration unit 22 is provided on the end wall 18 at the left-hand (front) end of the container 10, and although not shown herein, doors are provided at the opposite right-hand (back) end of the container 10. The doors allow loading and unloading of cargo to and from the interior of the container 10, and can be of the overhead type or the hinged type as desired.

Figure 2:
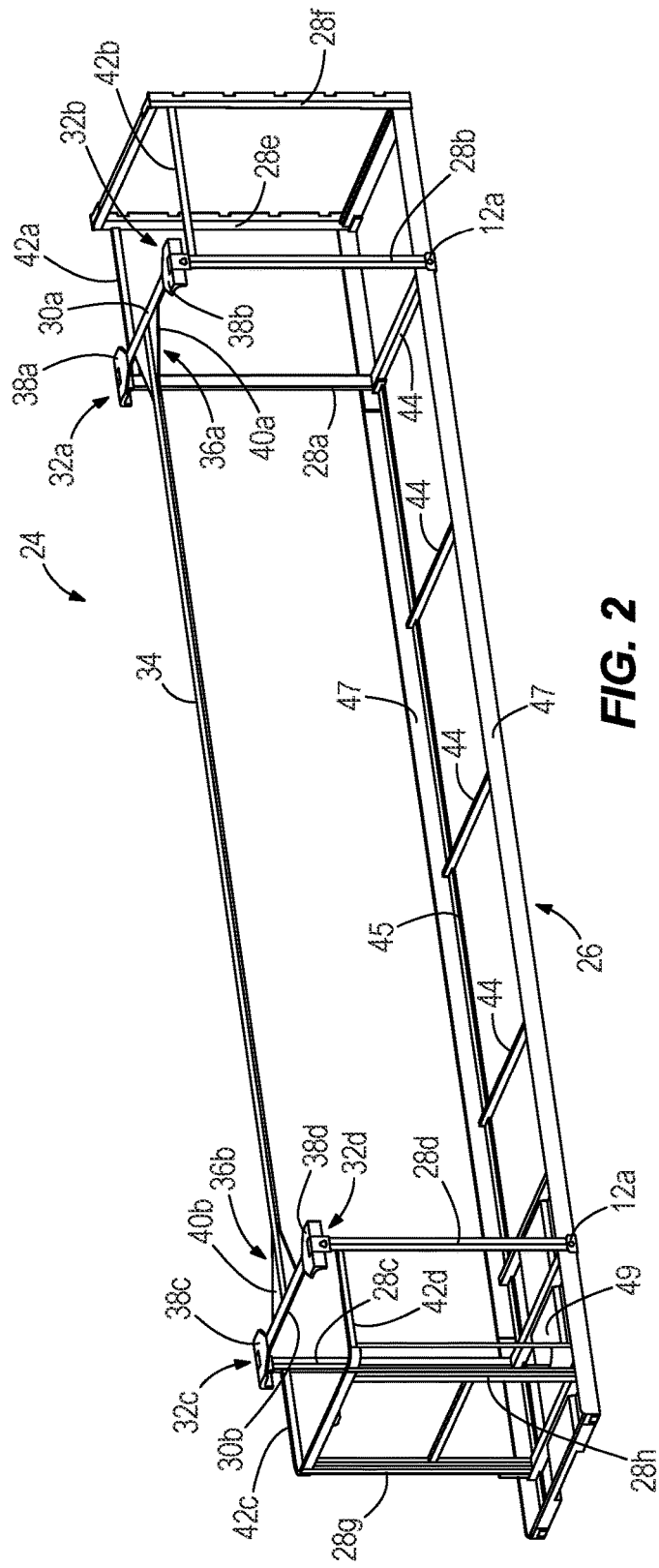
FIG. 2 is a perspective view of an exoskeleton of the temperature-controlled intermodal container.

Now referring to FIG. 2, a supporting frame 24 (exoskeleton) of the container 10 will be described. The container 10 comprises a supporting frame 24 having a rectangular base 26, a first pair of upright posts 28a, 28b extending upwardly from the rectangular base 26, and a second pair of upright posts 28c, 28d extending upwardly from the rectangular base 26 at a generally opposite end thereof. As shown, the upright posts 28a, 28b are located toward the back end of the frame 24, and are spaced inboard of the very end of the base 26. Upright posts 28c, 28d are located toward the front end of the frame 24, and are spaced inboard of the very front of the base 26. A plurality of transverse beams 44 connect opposite sides of the rectangular base 26 along the longitudinal length of the base 26. In the example shown, the transverse beams 44 are welded to flanges 45 provided two longitudinal beams 47 making up part of the base 26. The supporting frame 24 further comprises a first cross-beam 30a connecting a top end 32a of a first post 28a in the first pair of upright posts to a top end 32b of a second post 28b in the first pair of upright posts. The supporting frame 24 further comprises a second cross-beam 30b connecting a top end 32c of a third post 28c in the second pair of upright posts to a top end 32d of a fourth post 28d in the second pair of upright posts. A longitudinally extending connector beam 34 has a first end 36a coupled to the first cross-beam 30a and a second end 36b coupled to the second cross-beam 30b and extends along the top of the frame 24. The frame 24 also includes a plate creating a tunnel section 49 extending rearward from the front of the frame 24 and coupled to several of the transverse beams 44. The tunnel section 49 defines a channel to accommodate a trailer chassis (not shown).

The corner fittings 12b (FIG. 1) are provided at each of the top ends 32a-32d of the upright posts 28a-28d. This ensures that lifting and stacking of the container 10 is done at points where structural members are present to bear the loads incurred during lifting or stacking. Additionally, bent-trapezoidal shaped gussets 38a-38d are provided for connecting each of the top ends 32a-32d of the upright posts 28a-28d to the first and second cross-beams 30a, 30b. The corner fittings 12b may be integral with or welded to the gussets 38a-38d. Triangular shaped gussets 40a, 40b are provided at each end of the connector beam 34 to couple the connector beam 34 to the cross-beams 30a, 30b. The gussets 38a-38d and 40a-40b may be welded to the frame members that they connect. The supporting frame 24 further comprises fifth and sixth upright posts 28e, 28f at one end (back) of the frame 24 outboard of the first and second upright posts 28a, 28b. Seventh and eighth upright posts 28g, 28h are provided at an opposite end (front) of the supporting frame 24 outboard of the third and fourth upright posts 28c, 28d. The upright posts 28e-28h define the four corners of the frame 24, and support the side walls 14, front end wall 18, and rear doors of the container 10. The upright posts 28a-28d also support the side walls 14 of the container, but additionally provide structural strength at the 40-foot points where stacking and lifting occur.

Longitudinally extending beams 42a, 42b connect the top ends 32a, 32b of the first and second upright posts 28a, 28b to the upper ends of the fifth and sixth upright posts 28e, 28f, respectively. Longitudinally extending beams 42c, 42d connect the top ends 32c, 32d of the upright posts 28c, 28d to the upper ends of the upright posts 28g, 28h, respectively. The longitudinally extending beams 42a-42d are slightly vertically lower than the longitudinal connector beam 34 and the top ends 32a-32d of the upright posts 28a-28d. This allows the longitudinally extending beams 42a-42d to support a lower edge of the roof panel, as will be described further herein below.

The supporting frame 24 may be comprised of roll-formed, extruded, and/or cast iron, steel, and/or aluminum. Alternative metallic alloys or composite constituents could be used to boost structural properties of the frame's components. Metallic frame design capitalizes on weight reduction by offloading some structural loading to the bonded supporting frame/panel system. The metallic components making up the supporting frame 24 can be joined with welds and/or mechanical fasteners. Supporting frame 24 ensures appropriate structure and durability at the container lift points (fittings 12b at the 40-foot points) and wear surfaces. However, the total structural metallic volume and cross section of the metallic members is significantly less than prior art designs, owing to optimized engineering analysis and the structural attributes attained in the composite panels described herein below. The ability to reduce the quantity of metal used in the container due to the composite panels yields a lighter overall container 10 with less metallic structure costs.

Now referring to FIGS. 3 and 4, the upright posts 28a-28d of the container 10 will be further described. FIG. 3 shows a side view of the container 10, and therefore only upright posts 28b, 28d can be seen. Additionally, refrigeration unit 22 has been removed from the front of the container 10. FIG. 4 shows a cross sectional view of an exemplary upright post 28b taken through the line 4-4 of FIG. 3, it being understood that posts 28a, 28c, and 28d are of the same construction. As shown in FIG. 4, the upright post 28b actually comprises two posts 46a, 46b made of steel or other suitable metal, positioned parallel one another. Each post 46a, 46b is hollow and comprises a rectangular cross section having rounded edges. The narrower sides of the rectangular posts 46a, 46b are adjacent one another, and as shown in the example, touch one another. The posts 46a, 46b may be welded together or held together with mechanical fasteners where they touch. In alternative examples, the post 28b is made of a single post, or of more than two posts, which have a rectangular or other cross section. The posts 46a, 46b are recessed into the side wall 14, which comprises two fiber reinforced plastic (FRP) layers 48, 50 surrounding and encapsulating insulation foam 52. (As will be described more fully below, the layers 48, 50 begin as sheets of glass fiber textile, which are subsequently integrally molded with the foam 52 by infusion of a matrix material, such that when hardened the sheets become fiber reinforced plastic layers that fully encapsulate the insulation foam 52.) The posts 46a, 46b are adhered to the FRP layer 48 using structural adhesive 54 at each area where the posts 46a, 46b are adjacent the FRP layer 48. The makeup of the side wall 14 will be described further herein below. Utilizing one or more steel posts 46a, 46b adjacent and welded or fastened to one another reduces the cross sectional area and therefore weight and thermal transmittance associated with prior art containers, in which a structural post might be so large it extends from an outer wall of the container to an inner wall thereof.

Figure 5:
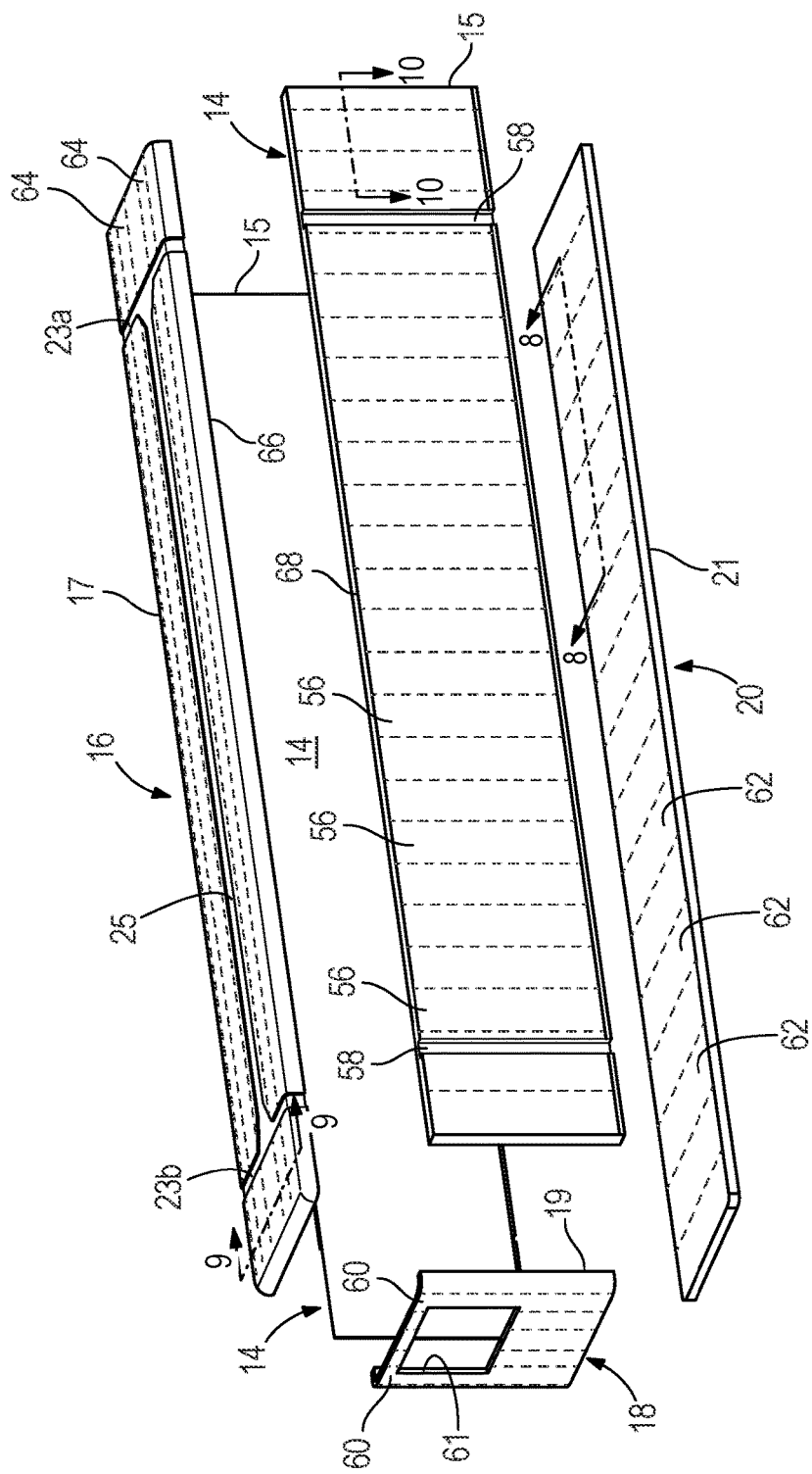
FIG. 5 is an exploded view of a plurality of panels of the intermodal container.

Now turning to FIG. 5, the panels that make up the side walls 14, end wall 18, roof 16, and floor 20 will be further described. Starting with the side walls 14, each side wall 14 comprises one FRP panel 15 made up of a plurality of "beams" 56, the orientation of which beams 56 is schematically shown by dashed lines. (The beams 56 will be described further herein below.) Each panel 15 comprises fiber reinforced plastic and insulation foam that have been integrally molded to one another, and as shown in FIG. 4 (see also FIGS. 11A and 11B), the fiber reinforced plastic (shown by fiber reinforced plastic layers 48, 50) comprises the outer surface of each panel 15 and fully encapsulates the insulation foam 52 within each panel 15. Additionally, each of the side walls 14 comprises two vertically extending recesses 58, which are indented from the exterior of the panel 15 toward the interior of the container 10, but not all the way through the width of the panel 15. These recesses 58 receive the posts 46a, 46b described herein above with reference to FIG. 4. In other words, the posts 46a, 46b fit within the recesses 58 and are therefore substantially flush with the outer surface of the side walls 14. However, because the depth of the recesses 58 is less than that of the panel, this ensures that insulation foam 52 is provided between the interior of the container and the metal posts 46a, 46b.

As can be seen from the dashed lines in FIG. 5, the side walls 14 comprise panels 15 having vertically extending integral beams 56, and the end wall 18 comprises a panel 19 having vertically extending integral beams 60. A window 61 in the end wall 18 provides a pathway for cool, refrigerated air to travel from the refrigeration unit 22 to the interior of the container 10. The window 61 may be cut out of the end wall panel 19 after it has been formed, or the panel 19 may be formed with the window during molding. In contrast to the vertically extending beams of the side and end walls, the floor 20 comprises a panel 21 having a plurality of transversely extending integral beams 62 and the roof 16 comprises a panel 17 having a plurality of longitudinally extending integral beams 64. Additionally, the roof panel 17 has two transversely extending recesses 23a, 23b proximate either longitudinal end thereof, and a longitudinally extending recess 25 connecting the two transversely extending recesses 23a, 23b, each of the transversely and longitudinally extending recesses being indented into a top surface of the roof 16. The transversely extending recesses 23a, 23b are longitudinally spaced so as to receive the first and second cross-beams 30a, 30b therein, respectively, and the longitudinally extending recess 25 is transversely located so as to receive the connector beam 34 therein. The door(s) at the back end of the container 10 may also be made of fiber reinforced plastic and insulation foam that have been integrally molded to one another, the fiber reinforced plastic comprising the outer surfaces of each door and fully encapsulating the insulation foam within each door.

Each of the panels 15, 17, 19, and 21 are adhered to one another using a structural adhesive along their edges. For example, a side edge 66 of the roof panel 17 has a structural adhesive applied thereto that causes it to adhere to a top edge 68 of side wall panel 15. The adhesive may be a methyl methacrylate (MMA), an epoxy, a resin, or an alternative product with superior thermal and structural bonding properties. Using an adhesive to bond the panels 15, 17, 19, and 21 together provides a thermal and vapor seal, as well as contributes to the overall system structure by fully distributing attachment loads rather than requiring localized loading, which is common with spaced mechanical fasteners. Additionally, the panels 15, 17, 19, and 21 can be bonded to the supporting frame 24 with the same types of adhesives described above. Again, these adhesive bonds contribute to the overall system structure by fully distributing loads rather than requiring localized loading, which is common with spaced mechanical fasteners. In one example, all panels 15, 17, 19, and 21 may be designed without the use of rivets, screws, bolts or other mechanical fastening devices in order to reduce localized stress points, to simplify system construction, and to reduce the thermal loss associated with items (such as mechanical fasteners) intruding into the system's insulation. In other examples, some panels may include metal, plastic, or wooden bracing molded into the panel for locating and fixturing.

Figure 6:
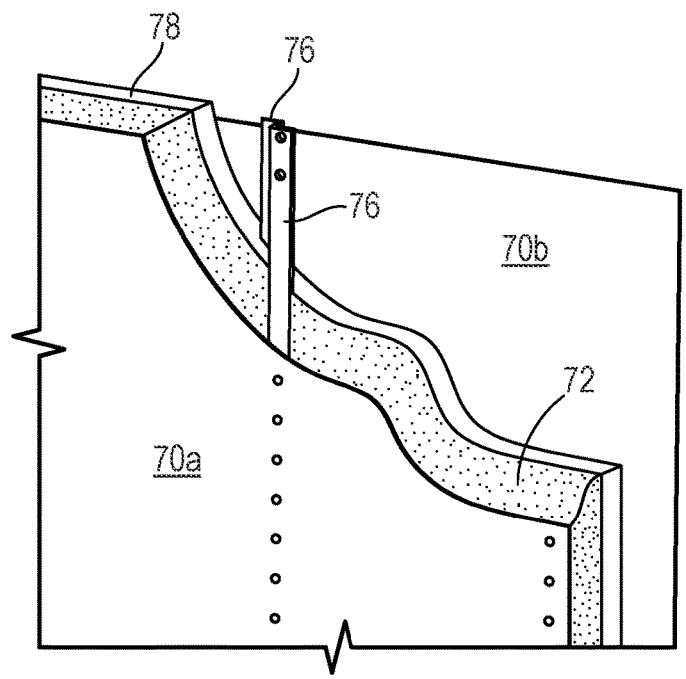
FIG. 6 is a partially cut away view of a panel according to one example of a prior art temperature-controlled container.

Now referring to FIGS. 6 and 7, construction of the panels 15, 17, 19, 21 as contrasted to prior art panels will be described. FIG. 6 shows a prior art panel comprising a layer of insulation 72 provided between a sheet of aluminum or a pre-formed sheet of fiber reinforced plastic 70*a* (serving as the interior surface of the container) and a sheet of aluminum 70*b* (serving as the exterior surface of the container). The insulation 72 is injected between the pre-formed FRP sheet 70*a* and the aluminum sheet 70*b* and inserted in a press to maintain dimensional stability. Structural metal strips 76 provided between the pre-formed FRP sheet 70*a* and the aluminum sheet 70*b* add rigidity and help with insulation foam adherence. As can be seen from FIG. 6, a top edge 78 of the insulation 72 is not encapsulated, which over time causes the insulation 72 to absorb moisture and lose insulative gasses, thereby causing loss of thermal efficiency.

Figure 7:
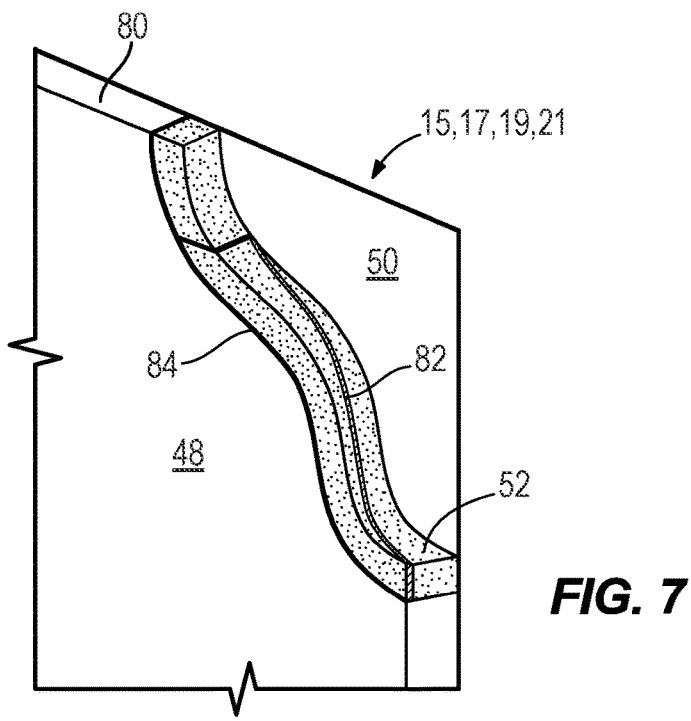
FIG. 7 is a partially cut away view of a panel that can be used to construct the temperature-controlled intermodal container of the present disclosure.

In contrast, as shown in FIG. 7, the panels 15, 17, 19, 21 according to the present disclosure comprise two FRP layers 48, 50 enclosing a layer of insulation foam 52. As can be seen from the top edge 80, the insulation foam 52 is fully encapsulated within a glass and matrix material layer (such as a hardened resin layer), according to a process of manufacturing the panels described further herein below. This matrix material layer is shown ending at line 84 for purposes of showing how it is integral with insulation foam 52, and integral with a sheet of glass fiber textile, thereby forming FRP layer 48; however, it should be understood that in reality the matrix material layer 84, insulation foam 52, and FRP layer 48 resulting from infusion of the glass fiber textile with the matrix material, have the same extent as the rear FRP layer 50. The panels 15, 17, 19, 21 further comprise an internal fiber reinforced plastic skeleton, as shown by an internal FRP layer 82. Internal FRP layer 82 may be formed from a glass fiber textile that has been infused with the matrix material as well. Because the entire panel 15, 17, 19, 21 is encapsulated in the matrix material, the present panel enhances thermal durability and increases retention of refrigeration gases used as the insulation foam's blowing agent.

Each panel 15, 17, 19, 21 is a single-piece unit comprised of beams with dimension, shape, and orientation designed to optimize thermal and structural properties of the system. The panels may be constructed independently as flat or semi-flat panels, and later adhered to one another as described with reference to FIG. 5. The panels are designed to maximize structural and thermal properties around discontinuous features of the container 10, such as curved panel sections, areas where the edges of the panels meet, areas for location of the fittings 12*a*, 12*b*, areas where the panels are indented/recessed to provide for locating elements of the support frame 24, etc. For example, with reference to FIGS. 8-11B, some exemplary cross sections of panels will be described.

Figure 8:
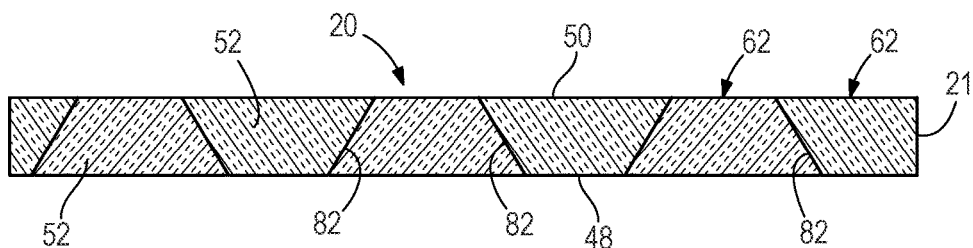
FIG. 8 is a cross sectional view of a panel that can be used to construct the floor of the intermodal container, taken through the line 8-8 in FIG. 5.

As shown in FIG. 8, a plurality of transverse beams 62 may be combined into a panel 21 serving as the floor 20 of the container 10. FIG. 8 shows a portion of a cross section of the floor panel 21 were it to be viewed from the side as shown in FIG. 5. Each beam 62 has a trapezoidal shape when viewed in cross-section, the shape being defined by the internal FRP layers 82 separating one beam 62 from another. Additionally, as referred to herein above, the FRP layers 48, 50 comprise the lower and upper surfaces of the floor 20, respectively. Insulation foam 52 fills and defines each trapezoidal shape.

Figure 9:
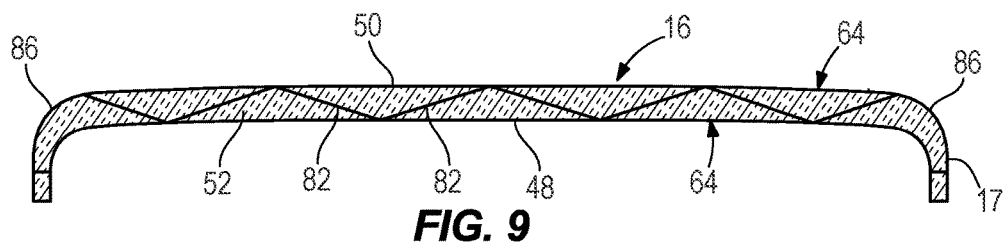
FIG. 9 is a cross sectional view of a panel that can be used to construct the roof of the intermodal container, taken through the line 9-9 in FIG. 5.

FIG. 9 shows a cross section of the panel 17 that serves as the roof 16 when viewed from the end as shown in FIG. 5. A plurality of longitudinal beams 64, each defined by the internal FRP layers 82, makes up the panel 17. Each beam 64 has a triangular shape when viewed in cross section. Insulation foam 52 fills and defines each triangular shape. The roof panel 17 is formed with longitudinally extending rounded edges 86, which maximize exterior aerodynamics of the container 10. The rounded edges 86 also maximize the shunting of water, snow, and ice from the roof 16. The rounded edges 86 may be molded as integral parts of the roof panel 17, according to the molding process described herein below, or may be separately molded parts that are later adhered to the roof panel 17. Again, the FRP layers 48, 50 make up the lower and upper surfaces of the panel 17, respectively.

Figure 10:
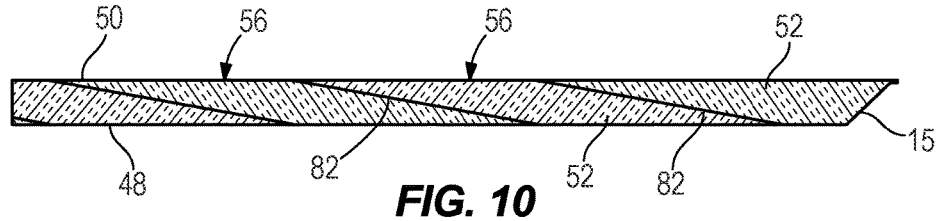
FIG. 10 is a cross sectional view of a panel that can be used to construct the side and end walls of the intermodal container, taken through the line 10-10 in FIG. 5.

FIG. 10 shows one example of a cross section of a panel 19, 15 that serves as the end wall 18 or the side walls 14, respectively. For exemplary purposes, the panel referred to will be the panel 15 that makes up one of the side walls 14, and is a cross section taken along line 10-10 shown in FIG. 5. The panel 15 comprises a plurality of vertically upright beams 56, each beam 56 having a parallelogram shape when viewed in cross section, as defined by the internal FRP layer 82 enclosed within the FRP layers 48, 50. Additionally, insulation foam 52 fills and defines each parallelogram shape.

Figure 11A:
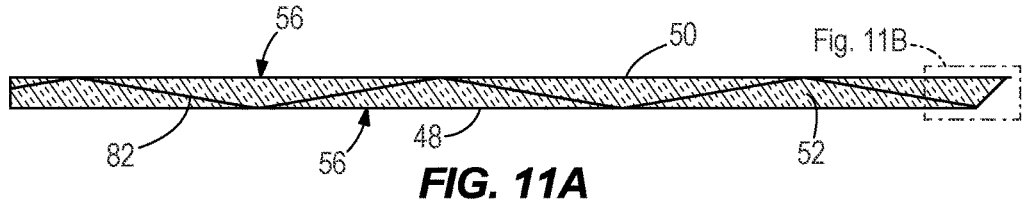
FIG. 11A is a cross sectional view of another example of a panel that can be used to construct the side and end walls of the intermodal container.
Figure 11B:
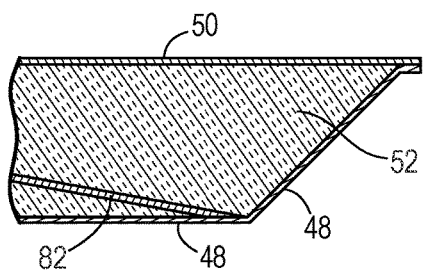
FIG. 11B is a detailed view of a portion of the panel shown in FIG. 11A.

FIG. 11A shows how the beams 56 of the side wall panel 15 and/or end wall panel 19 could alternatively be obtuse triangular shapes defined by the internal FRP layers 82 and enclosed within the FRP layers 48, 50. FIG. 11B shows a detail of the panel of FIG. 11A, and indicates the insulation foam 52, the FRP layers 48, 50, and the internal FRP layer 82 that defines the shape of each individual beam 56.

Other shapes for the beams in each panel could be provided, such as nested multi-trapezoidal, multi-triangular, or sinusoidal corrugation, as well as single trapezoid, parallelogram, equilateral, isosceles, acute, or obtuse triangles. Additionally, any of the cross sectional shapes of beams shown in FIGS. 8-11A could be used in a panel besides the one in which the shape is described as being used. The orientations of the beams could also be switched from vertical to horizontal and/or from longitudinal to transverse. In general, segmentation of each panel as provided by the internal FRP layer 82 ensures that in the event a beam is pierced, rather than potential loss of insulation capacity over the entire panel, only insulation gases found within the pierced beam section defined by the FRP layers 48, 50 and the internal FRP layer 82 will have the opportunity to escape. Additionally, the internal FRP layers 82 serve as structural shear ties when the panels are molded, and are designed such that heat flux is homogeneously distributed throughout the container's panels, removing hot-spots associated with prior art container designs.

Figure 12:
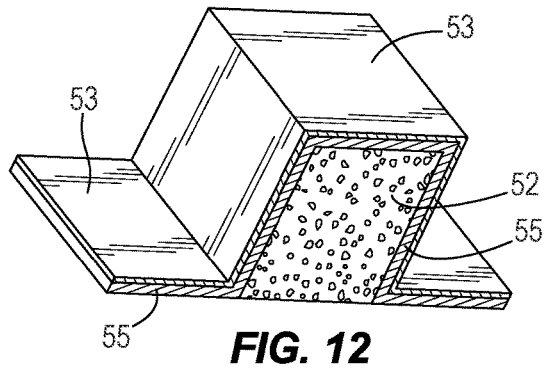
FIG. 12 is a schematic showing one example of a beam that can be used to construct a panel according to the present disclosure.

FIG. 12 shows a cross section of one "beam" of a panel; however, as shown in FIGS. 5 and 8-11B, many beams 56, 60, 62, 64 are provided in any given panel 15, 17, 19, 21. Each beam is a preformed unit comprising a specific shape of insulation foam 52, a barrier material 55, and a dry glass fiber textile 53. The layer of barrier material 55 is provided co-extensive with the dry glass fiber textile 53 and prevents inundation of the glass fibers in the textile by the insulation foam 52 during the manufacture of the foam/glass beams.

The barrier material 55 may comprise spun bound polyester, cellulose, or other like materials. (The combined barrier material 55 and glass fiber textile 53, once infused with resin, will become the internal FRP layer 82 referred to herein above, as will be described more fully herein below). The insulation foam 52 can be manipulated/cut/molded to form any of the specific cross sectional shapes shown in FIGS. 8-11A. It should be understood that in order to form a beam, each piece of insulation foam has a certain length, which length allows it to span the height or width of the panel it will be used to construct.

Figure 21:
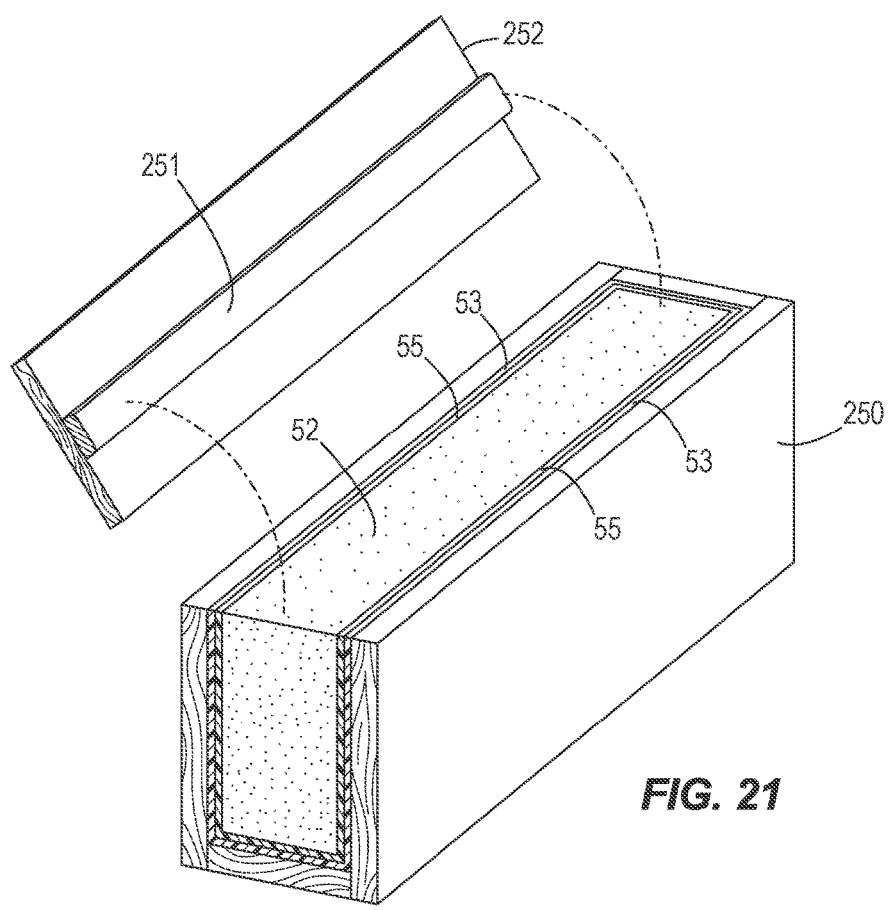
FIG. 21 illustrates one example of a mold that can be used to form a beam according to the present disclosure.

In one example, with reference to FIG. 21, in order to form a preformed beam, the glass fiber textile 53 and the barrier material 55 may first be pattern cut. The pattern cut materials 53, 55 may then be layered in a first mold 250 having a cross sectional shape matching the desired cross-sectional shape of the beam (here, an elongated rectangle). A prescribed quantity of insulation foam 52 (for example, self rising polyurethane foam) may then be injected into the first mold 250. The mold 250 in FIG. 21 is shown with its near end cut away in order to show how the barrier material 55 and glass fiber textile 53 surround the foam 52 on three sides. After the mold is filled with foam, the lid 252 on the first mold 250 may be closed and locked to manage foam expansion and density. In one example, either the lid 252 or the inside bottom surface of the mold 250 may be provided with a longitudinally extending projection, which projection is specifically shaped to form a recess 58 on the side wall 14 (see FIG. 5) or any of the other indentations or recesses mentioned herein. For example, see projection 251 extending along the length of lid 252, which, when the lid 252 is closed over the foam 52, will push into the foam and form a molded, longitudinally extending recess. The first mold 250 may then be opened after a desired amount of curing time, and the preformed beam removed from the mold 250. More detailed examples of how the preformed beams may be constructed, including continuous methods of manufacture, are provided in U.S. Pat. Nos. 5,429,066; 5,800,749; and 6,206,669, assigned to Compsys, Inc. of Melbourne, Fla., and will therefore not be described further herein.

Figure 22:
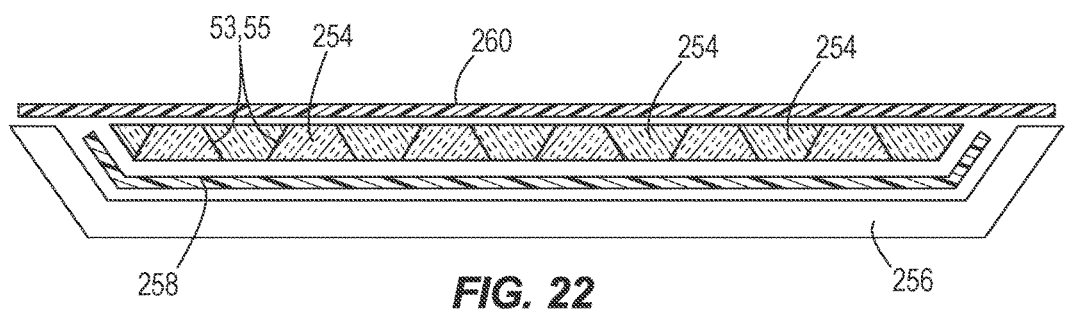
FIG. 22 illustrates one example of a mold that can be used to form a panel according to the present disclosure.

With reference to FIG. 22, to form a panel, a plurality of preformed beams 254 are placed adjacent one another in a second mold 256 on top of a sheet of glass fiber textile 258. The preformed beams, once placed, and are then covered with another sheet of glass fiber textile 260. The mold 256 into which the preformed beams 254 and sheets of glass fiber textile 258, 260 are placed can be shaped and sized to create any of the panel shapes shown in FIG. 5. The beams 254 may be placed such that a beam that was formed with a recess (see recess 58, FIG. 5) is placed at a location specifically designed to match the location of a portion of the supporting frame 24 (e.g., upright post 28b) that will be placed in the recess. The mold 256 is then infused with a matrix material to form the panel. The panel can be formed using closed molding techniques such as vacuum assisted resin transfer molding, Seeman composite resin infused molding processes, vacuum infused processing, zero injection pressure infusion, light resin transfer molding, or resin transfer molding. In one example, the matrix material may comprise an epoxy or a resin. In other examples, iso- or ortho-resins can be used for the matrix material, or discrete, co-cured combinations of materials such as vinyl ester, dicyclopentadiene polyester, and/or urethane can be used in order to boost system durability and structural properties. Pre-impregnated materials may also be used, whether they be autoclave cured or out-of-autoclave cured. Additionally, in some examples, a segregated layer of self-healing microcapsules of epoxy or resin could be molded into specific portions of the panels to allow for self-propagated repair.

It is not until the sheets of glass fiber textile 53, barrier material 55, and insulation foam 52 (making up a preformed beam 254) are infused with the matrix material and cured in the second mold 256 that the panel achieves the composite structure properties. For example, the combined barrier material 55 and glass fiber textile 53 of the beam become the internal FRP layer 82 referred to herein above. The sheets of glass fiber textile 258, 260 provided in the mold below and on top of the preformed beams 254 become the FRP layers 48, 50 on opposite faces of the panels, referred to herein above.

The panels can be either molded with the appropriate material quality to be considered a final finish on both their inner and outer surfaces, or can be prepared to accept a USDA food-grade thermo plastic or thermo set liner. The panels could be molded with a combination of matrix materials to enhance properties such as scuff resistance and toughness where necessary. The panels could also include a metallic or plastic scuff-resistant panel, that when bonded to the FRP panel, could enhance the structural connection between the walls 14, 18, floor 20, and roof 16. Materials used for the FRP layers that make up the exterior of the container 10 may be designed to minimize adherence of drag-inducing and thermally-absorptive materials. Super hydrophobic and/or oleophobic materials may be used to reduce temporary attachment of various road and rail-born impurities such as coal dust, dirt, mud, oil and the like. These materials may also act to reduce the surface tension on the panels and parts so that water does not attach as it typically would on painted or gel-coated surfaces. Any settled particulates will be rapidly dispensed during water application, either by washing or during normal rain events. The materials chosen may also reduce the adherence of snow and ice, further reducing the load associated with such materials.

Now referring to FIGS. 13 and 14, the roof 16 will be described in further detail. FIG. 13 shows an example of the roof 16 in an inverted orientation. As described herein above, the roof 16 has rounded edges 86. Additionally, an inner surface of the roof 16 has air deflection fins 88 positioned along its length that splay outwardly from one another on a diagonal from an open center aisle 90. The fins 88 project downwardly into the interior of the container 10 from the inner surface of the roof panel 17 and may be extrusions or vacuform shapes that are adhered with pressure sensitive adhesive or glued to the underside of the roof panel 17. Together the fins 88 ensure that air flow along the interior underside of the roof 16, as shown by the arrows in FIG. 14, is dispersed throughout the interior of the container 10. Air travels from the refrigeration unit 22 (FIG. 1) through a vent 91, through the center aisle 90, between each of the fins 88, and out toward peripheral edges 92 of the interior of the roof 16. Starting at a front end 93 of the roof 16 and working toward a back end 95, the fins 88 get progressively longer and closer to the center aisle 90 at their inner ends. This is because air can spread out more at the front of the container, where flow is the fastest due to proximity with the refrigeration unit 22. Toward the back of the container, the air is moving more slowly, and a fin that projects further into the air stream is required to divert air to the peripheral edges 92. The internal curved radii at the peripheral edges 92, mimicking the rounded outer edges 86, also enhance distribution of cooled air throughout the container 10 by forcing air down toward the cargo.

Now referring to FIGS. 15-16C, the floor 20 of the container 10 will be further described. FIG. 15 shows a top view of the container 10, while FIG. 16A shows a cross sectional view along the line 16A-16A of FIG. 15. As shown in FIG. 16A, the floor 20 comprises transverse beams 44. For simplicity, not all of the beams 44 are shown in FIG. 16A, although the beams 44 can be seen by comparison with FIG. 2. The transverse beams 44 comprise different sized hollow rectangular elements of steel or other metal, depending on their placement along the longitudinal length of the rectangular base 26, as shown by the details in FIG. 16B and FIG. 16C. For example, the beams 44 provided at or near the 40-foot points (see FIG. 16C) are larger and stronger than the beams 44 provided elsewhere (see FIG. 16B). The beams 44 are set into recesses in the panel 21 that makes up the floor 20. The beams 44 may be molded as part of the floor panel 21 during the molding process, or may be adhered inside molded recesses (see description of FIGS. 21 and 22 above) after the panel molding process is complete. It should be noted that each of the recesses on the underside of the floor panel 21 for insertion of the beams 44 are not shown in FIG. 5 for the sake of clarity. The beams 44 at the 40-foot points may be supported by an extra sheet 51 of metal adhered or welded underneath the beams 44 and overlapping a portion of the outer FRP layer 48 to provide extra strength in this area (see FIG. 16C). Due to the structure achieved by the molded floor panel 21 serving as the floor 20, the number of transverse beams 44 needed as shown in FIG. 2 represents an 80-90% reduction in number of floor cross members over prior art designs.

In some examples, the interior surface 100 of floor 20 could be provided with multiple coatings to enhance structural rigidity, bolster scuff resistance, and/or provide traction for human and/or machine traffic. The floor coating could be urethane, co-cured matrices, or matrices filled with various materials to save weight and/or add traction. The floor 20 could receive an aluminum plate 102 or extrusion which would accomplish the enhancements noted above, but would also create an offset 104 so that air could flow below any freight in the container 10. The floor 20 may also be coated with a super hydrophobic and/or oleophobic coating that prevents the adhesion of water and oils, thus increasing the container's interior cleanliness. Corner radii may be provided on the floor's vertical returns (i.e., where the floor 20 connects to the side walls 14) to allow for stress concentration reduction and to provide for easy cleaning.

Figure 19:
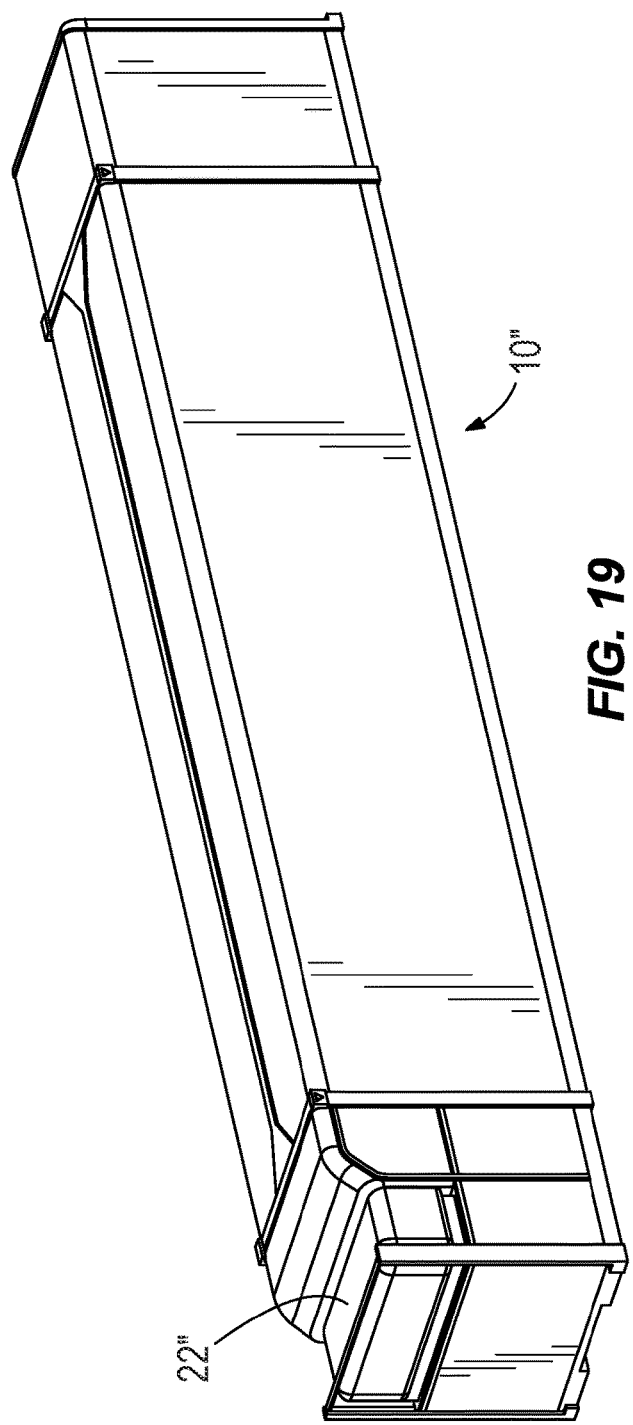

FIGS. 17-19 represent different examples of the container 10, 10', 10" in order to illustrate its adaptability and modularity. In general, the panel molds are designed to account for future system improvements, so that when new systems are developed, the container part lengths can be adjusted to account for increased container volume or other improvements.

The container 10' shown in FIG. 17 has a thinner refrigeration unit 22' on the end wall 18. The panels for the side walls 14', roof 16', and floor 20' have been sized up to fit this refrigeration unit 22'. In another example (not shown herein) the container does not have a refrigeration unit, and is designed for short dray utilization, during which normal temperature variation is allowed during transportation.

FIG. 18 illustrates the container 10 that has been described hereinabove, comprising a larger refrigeration unit 22 on the end wall 18, and is shown again here for purposes of comparison with the container 10' of FIG. 17. Also of note are corner shield 106, fuel tank 108, and front end cage 110. Corner shields 106 are provided on each front edge of the container 10 to provide improved aerodynamics. The fuel tank 108 provides fuel for the refrigeration unit 22, while the front end cage 110 holds the refrigeration unit 22 in place on the supporting frame 24 and protects it from collision damage.

FIG. 19 illustrates another example of the container 10", in which the panel design has been developed to accommodate full floor space and a smaller refrigeration unit 22". For example, the refrigeration unit 22" could be half the height of the unit shown in FIG. 17, and therefore leave room for loading of cargo on the cleared floor space beneath the refrigeration unit 22". This example could be implemented with improved thermal insulation materials to compensate for a smaller refrigeration unit. As shown in FIG. 19, these materials can be utilized in the wall preforms and exoskeleton without re-tooling.

Figure 23:
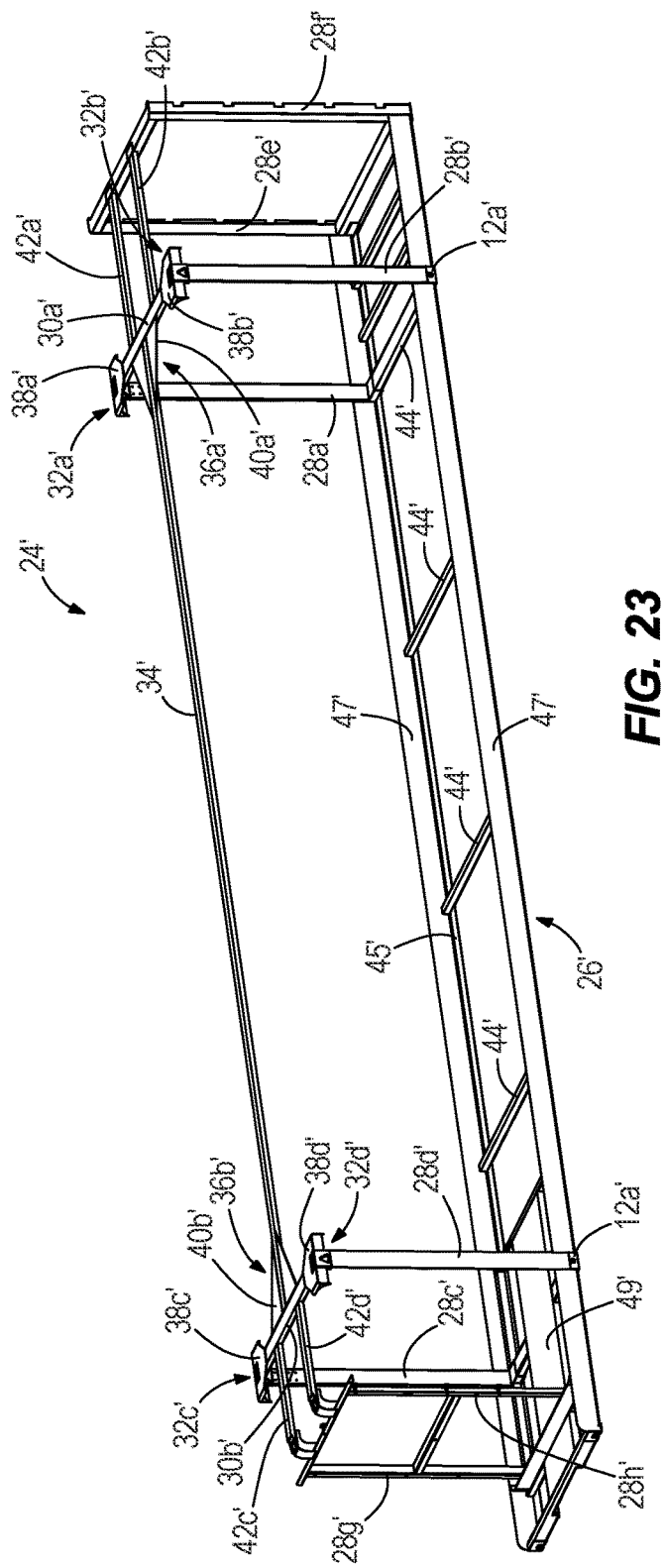
FIG. 23 illustrates another example of an exoskeleton of the temperature-controlled intermodal container.

The exoskeleton of the container could also be modified to provide certain advantages. For example, as shown in FIG. 23, longitudinally-extending beams $42a'$-$42d'$ have each been moved slightly inboard with respect to the lateral sides of the frame 24', as well as vertically upward such that they connect to the first and second cross-beams $30a'$, $30b'$. The rearrangement and re-sizing of longitudinally-extending beams $42a'$-$42d'$ provides more structural stiffness in these areas. Additionally, a greater number of transverse beams 44' are provided at the rear end of the frame 24', and are more densely spaced than in other areas along the rectangular base 26'. Extra transverse beams 44' in this rear area near the doors provide added support for vehicles such as forklifts that are continually moved on and off the container in its assembled form, and therefore more durability. It should be understood that panels for the roof, walls, floor, and front can be attached to this frame 24' in the same way as described with respect to the frame 24 of FIG. 2, with additions of recesses or slight modifications to the location and/or shape of the recesses into which the structural frame's members would fit. Various other frame configurations, depending on the application and load requirements, are contemplated.

According to each of the examples hereinabove, the exterior of the container 10, 10', 10" is optimized to provide structural integrity as well as optimal aerodynamics. The roof 16 has curved edges, which reduce stress concentrations at connection points associated with prior art constructions. Curved roof surfaces also reduce turbulence associated with abrupt edges known in the prior art. Container fittings $12a$, $12b$ are designed with aerodynamics in mind and do not intrude into the roof or floor sections. Adhered aluminum extrusions could also be provided on the exterior of the side wall panels 15 to provide both stiffness and scuff resistance. Indented character lines 94 (see for example FIG. 17) can also be provided on each side wall 14 to increase rigidity. The character lines may be provided by carving a notch in each pre-molded beam or by molding each beam with a notch, which notches all align to create the indentation 94 when the beams are placed side-by-side. Alternatively, the indentation 94 can be provided by pressure applied during molding of the panel, or by cutting into a formed panel and applying another application of resin or epoxy over the cut. The rigidity/stiffness provided by the indented character line 94 is beneficial for manipulation of the panels 15 during de-molding and assembly and also adds structural rigidity to the final container 10, 10', 10".

Figure 20:
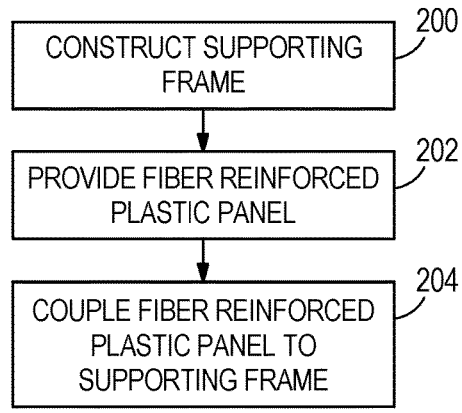
FIGS. 20, 20A, and 20B show methods for constructing an intermodal container according to the present disclosure.

Now referring to FIG. 20, the present disclosure also includes a method of constructing an intermodal container 10. As shown at step 200, the method includes constructing a supporting frame 24. As described herein above with respect to FIG. 2, the supporting frame 24 may have a rectangular base 26; a first pair of upright posts 28a, 28b extending upwardly from the rectangular base 26; a first cross-beam 30a coupling a top end 32a of a first post 28a in the first pair of upright posts to a top end 32b of a second post 28b in the first pair of upright posts; a second pair of upright posts 28c, 28d extending upwardly from the rectangular base 26 proximate an opposite end thereof; a second cross-beam 30b coupling a top end 32c of a third post 28c in the second pair of upright posts to a top end 32d of a fourth post 28d in the second pair of upright posts; and a longitudinally extending connector beam 34 having a first end 36a coupled to the first cross-beam 30a, and a second end 36b coupled to the second cross-beam 30b.

Figure 20A:
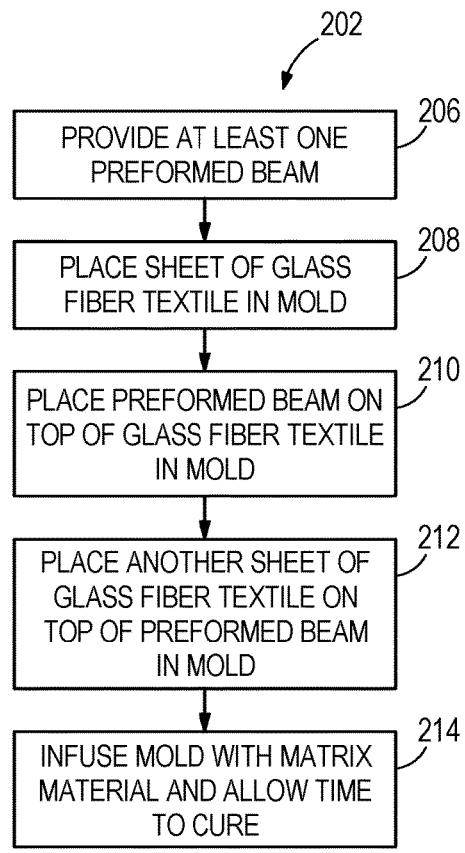

Next, as shown at step 202, the method further includes providing a fiber reinforced plastic panel. As described above with respect to FIGS. 8-12, the fiber reinforced plastic panel may be formed of glass fiber textile 53 and insulation foam 52. In one example, now referring to FIG. 20A, providing the fiber reinforced plastic panel comprises providing at least one preformed beam comprising a first sheet of glass fiber textile and insulation foam, as shown at step 206. With reference to both FIGS. 20A and 22, the method may next include placing a second sheet of glass fiber textile 258 in a mold 256, as shown at step 208. The mold 256 may have the size and shape of the panel that is to be formed. Next, as shown at step 210, the method includes placing the at least one preformed beam 254 on top of the second sheet of glass fiber textile 258 in the mold 256. As many preformed beams 254 as are needed to fill the mold and construct the shape of the panel may be used. Next, as shown at step 212, the method includes placing a third sheet of glass fiber textile 260 on top of the at least one beam. The method next includes infusing the mold 256 with a matrix material and allowing time for the panel to cure, as shown at step 214.

Figure 20B:
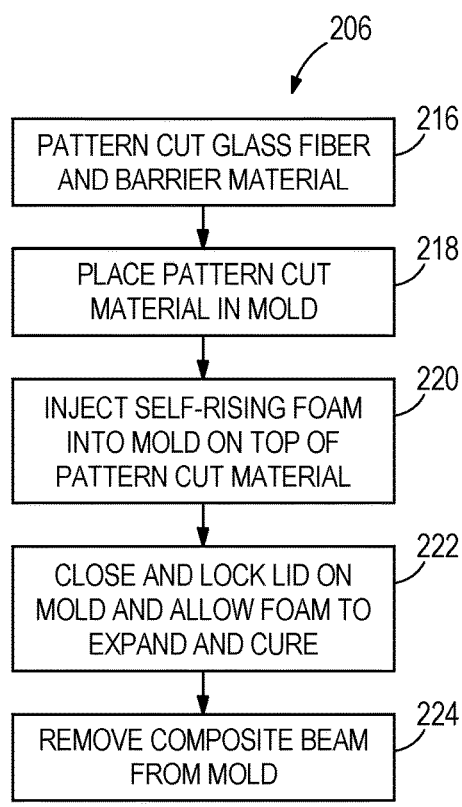

As shown in FIG. 20B, step 206 of providing the preformed beam can, in one example, include pattern cutting glass fiber and barrier material to a desired shape, as shown at step 216. Now referring to both FIGS. 20B and 21, next, as shown at step 218, the pattern cut materials can be placed in a mold 250. This mold 250 will have an interior size and shape of the desired size and shape of the beam, and is not the same mold as that used to construct the panel. Next, as shown at step 220, self-rising foam is injected into the mold on top of the pattern cut material. Next, the lid 252 on the mold 250 is closed and locked, as shown at step 222. Once the foam 52 has been given time to expand and cure, the composite beam is removed from the mold, as shown at step 224. The preformed composite beam may then be placed atop a sheet of glass fiber textile 258 in another mold 256 alongside other preformed beams 254, as discussed above.

Additionally, referring back to FIG. 20, once the panels have been formed of the preformed beams, the method next includes coupling the fiber reinforced plastic panels to the supporting frame 24 so as to form at least one of a side wall 14, an end wall 18, a roof 16, and a floor 20 of the container 10. See step 204. The panels are provided to an interior of the frame 24, and any recesses provided in the panels are lined up with their corresponding structural elements that make up the frame 24. The panels are then pressed outwardly such that the recesses are slotted around the posts and beams of the frame 24, and the posts and beams are adhered in the recesses using structural adhesive that has previously been applied in the recesses. The panels are therefore coupled inwardly of the rectangular base 26, the first and second pairs of upright posts 28a-28d, the first and second cross-beams 30a, 30b, and the connector beam 34, such that the supporting frame 24 forms an exoskeleton of the container. Because the frame 24 in this way acts as an exoskeleton, the fittings 12a, 12b are able to be joined directly to the structural frame 24, which provides extra strength to these connections.

All the ideas noted above could be applied to containers other than temperature-controlled intermodal containers, such as non-refrigerated intermodal containers, refrigerated trailers, fixed boxed delivery trucks, recreational vehicles, and mobile or fixed emergency shelters. Additionally, the presently described container panels may be used outside of the transportation realm due to their structural integrity.

This written description uses examples of the present disclosure, including the best mode, and enables any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An intermodal container comprising:
   a supporting frame having:
      a rectangular base;
      a first pair of upright posts extending upwardly from the rectangular base;
      a first cross-beam coupling a top end of a first post in the first pair of upright posts to a top end of a second post in the first pair of upright posts;
      a second pair of upright posts extending upwardly from the rectangular base proximate an opposite end thereof;
      a second cross-beam coupling a top end of a third post in the second pair of upright posts to a top end of a fourth post in the second pair of upright posts; and
      a longitudinally extending connector beam having a first end coupled to the first cross-beam, and a second end coupled to the second cross-beam; and
   a plurality of panels, each panel in the plurality of panels comprising fiber reinforced plastic and insulation foam that have been integrally molded to one another;
   wherein the plurality of panels are coupled to the supporting frame so as to form at least one of a side wall, an end wall, a roof, and a floor of the container;
   wherein the panels in the plurality of panels are coupled inwardly of the rectangular base, the first and second pairs of upright posts, the first and second cross-beams, and the connector beam, such that the supporting frame forms an exoskeleton of the container;
   wherein first and second panels forming first and second opposing side walls each have two vertically extending recesses indented into outer surfaces thereof, the recesses being laterally spaced with respect to one another so as to receive the first, second, third, and fourth posts therein, respectively;
   wherein a panel forming the roof has two transversely extending recesses proximate either longitudinal end thereof, and a longitudinally extending recess connecting the two transversely extending recesses, each of the transversely and longitudinally extending recesses being indented into a top surface of the roof; and
   wherein the transversely extending recesses are longitudinally spaced so as to receive the first and second cross-beams therein, respectively, and the longitudinally extending recess is transversely located so as to receive the connector beam therein.

2. The intermodal container of claim 1, wherein the panels in the plurality of panels are adhered to one another and to the supporting frame with a structural adhesive.

3. The intermodal container of claim 1, further comprising a plurality of fittings, each fitting in the plurality of fittings provided at a respective top end of the first, second, third, and fourth posts for enabling the container to be lifted by a crane.

4. The intermodal container of claim 1, wherein the fiber reinforced plastic forms an outer surface of each panel in the plurality of panels and fully encapsulates the insulation foam within each panel.

5. The intermodal container of claim 4, wherein each panel in the plurality of panels comprises an internal fiber reinforced plastic layer.

6. The intermodal container of claim 5, wherein each panel in the plurality of panels comprises a plurality of preformed beams, each beam in the plurality of preformed beams comprising an insulation foam core surrounded by a glass fiber textile, both of which have been infused with resin.

7. The intermodal container of claim 1, wherein each of the first, second, third, and fourth posts comprises two rectangular steel beams welded to one another along their lengths.

8. A method of constructing an intermodal container, the method comprising:
constructing a supporting frame having:
a rectangular base;
a first pair of upright posts extending upwardly from the rectangular base;
a first cross-beam coupling a top end of a first post in the first pair of upright posts to a top end of a second post in the first pair of upright posts;
a second pair of upright posts extending upwardly from the rectangular base proximate an opposite end thereof;
a second cross-beam coupling a top end of a third post in the second pair of upright posts to a top end of a fourth post in the second pair of upright posts; and
a longitudinally extending connector beam having a first end coupled to the first cross-beam at a location halfway between where the first cross-beam is coupled to the top end of the first post and to the top end of the second post, and a second end coupled to the second cross-beam at a location halfway between where the second cross-beam is coupled to the top end of the third post and to the top end of the fourth post;
providing a plurality of fiber reinforced plastic panels, each panel in the plurality of panels being forming of glass fiber textile and insulation foam;
coupling the panels in the plurality of panels to the supporting frame inwardly of at least one of the rectangular base, the first and second pairs of upright posts, the first and second cross-beams, and the connector beam so as to form at least one of a side wall, an end wall, a roof, and a floor of the container, such that the supporting frame forms an exoskeleton of the container;
coupling first and second panels in the plurality of panels to the supporting frame to form first and second opposing side walls, each of the first and second panels having two vertically extending recesses indented into outer surfaces thereof, the recesses being laterally spaced with respect to one another so as to receive the first, second, third, and fourth posts therein, respectively; and
coupling a third panel in the plurality of panels to the supporting frame to form the roof, the third panel having two transversely extending recesses proximate either longitudinal end thereof, and a longitudinally extending recess connecting the two transversely extending recesses, each of the transversely and longitudinally extending recesses being indented into a top surface of the roof;
wherein the transversely extending recesses are longitudinally spaced so as to receive the first and second cross-beams therein, respectively, and the longitudinally extending recess is transversely located so as to receive the connector beam therein.

9. The method of claim 8, wherein providing each panel in the plurality of panels comprises:
providing at least one beam that has been preformed of a first sheet of glass fiber textile and insulation foam;
placing a second sheet of glass fiber textile in a mold;
placing the at least one preformed beam on top of the second sheet of glass fiber textile;
placing a third sheet of glass fiber textile on top of the at least one preformed beam; and
infusing the mold with a matrix material.

10. The method of claim 9, further comprising placing the first sheet of glass fiber textile into a different mold and injecting the different mold with insulation foam so as to form the at least one beam.

11. The method of claim 10, further comprising placing a sheet of barrier material between the first sheet of glass fiber textile and the insulation foam when forming the at least one beam.

12. The method of claim 9, further comprising providing and placing a plurality of preformed beams side-by-side in the mold on top of the second sheet of glass fiber textile before placing the third sheet of glass fiber textile on top of the plurality of preformed beams and infusing the mold with the matrix material.

13. The method of claim 8, further comprising adhering the panels in the plurality of panels to the supporting frame with a structural adhesive.

14. The method of claim 8, further comprising providing a plurality of transverse beams connecting opposite sides of the rectangular base along a longitudinal length of the rectangular base.

15. The method of claim 8, further comprising welding two rectangular steel beams to one another along their lengths so as to form each respective upright post.

* * * * *

UNITED STATES PATENT AND TRADEMARK OFFICE
CERTIFICATE OF CORRECTION

PATENT NO. : 9,828,164 B2
APPLICATION NO. : 14/706188
DATED : November 28, 2017
INVENTOR(S) : John Clifford Denson Page 1 of 1

It is certified that error appears in the above-identified patent and that said Letters Patent is hereby corrected as shown below:

In the Claims

In Claim 8, Column 15, Line 52, delete "forming" and insert --formed--.

Signed and Sealed this
Twenty-seventh Day of February, 2018

Andrei Iancu
*Director of the United States Patent and Trademark Office*